(12) United States Patent
Mirsky et al.

(10) Patent No.: US 9,879,688 B2
(45) Date of Patent: Jan. 30, 2018

(54) ENHANCED TURBOCOMPRESSOR STARTUP

(71) Applicant: Compressor Controls Corporation, Des Moines, IA (US)

(72) Inventors: Saul Mirsky, West Des Moines, IA (US); Wayne Jacobson, Des Moines, IA (US); Jeff McWhirter, Spring, TX (US)

(73) Assignee: Compressor Controls Corporation, Des Moines, IA (US)

( * ) Notice: Subject to any disclaimer, the term of this patent is extended or adjusted under 35 U.S.C. 154(b) by 1138 days.

(21) Appl. No.: 14/030,035

(22) Filed: Sep. 18, 2013

(65) Prior Publication Data

US 2014/0030058 A1    Jan. 30, 2014

Related U.S. Application Data

(60) Continuation of application No. 12/128,265, filed on May 28, 2008, now abandoned, and a
(Continued)

(51) Int. Cl.
*F04D 27/02* (2006.01)

(52) U.S. Cl.
CPC ..... *F04D 27/0261* (2013.01); *F04D 27/0292* (2013.01)

(58) Field of Classification Search
CPC .......................... F04D 27/0261; F04D 27/0292
(Continued)

(56) References Cited

U.S. PATENT DOCUMENTS

| 4,164,035 A | 8/1979 | Glennon |
| 4,281,970 A | 8/1981 | Stewart |

(Continued)

FOREIGN PATENT DOCUMENTS

| EP | 0732509 | 9/1996 |
| EP | 0932091 | 7/1999 |

(Continued)

OTHER PUBLICATIONS 10 pages—presented at the 2007 LNG 14 conference, entitled "Technical Challenges During the Engineering Phases of the Qatargas II Large LNG Trains" by Chavez, et al.
(Continued)

*Primary Examiner* — Christopher Verdier
(74) *Attorney, Agent, or Firm* — Snyder, Clark, Lesch & Chung, LLP

(57) ABSTRACT

A control method and apparatus for startup of turbocompressors to avoid overpowering a driver of the turbocompressor. In a first embodiment, the control system monitors input signals from transmitters of various control inputs. When the input signals exceed threshold values, the control system begins to close the antisurge valve. In a second embodiment, the antisurge valve begins to close after a predetermined time measured from the time startup is initiated. In both embodiments, the antisurge valve continues to ramp closed until the compressor has reached its operating zone, or until the compressor's operating point reaches a surge control line, at which point the antisurge valve is manipulated to keep the compressor from surging.

19 Claims, 8 Drawing Sheets

Related U.S. Application Data continuation-in-part of application No. 13/743,418, filed on Jan. 17, 2013, now Pat. No. 8,540,498, which is a division of application No. 12/047,938, filed on Mar. 13, 2008, now Pat. No. 8,360,744.

(58) Field of Classification Search
USPC ..... 415/1, 17, 19, 26–29, 36–37, 47, 49, 50, 415/119, 145; 417/18, 19, 22
See application file for complete search history.

(56) References Cited

U.S. PATENT DOCUMENTS

| | | |
|---|---|---|
| 5,242,263 A | 9/1993 | Mondoloni |
| 5,743,715 A | 4/1998 | Staroselsky |
| 5,967,742 A | 10/1999 | Mirsky |
| 6,308,531 B1 | 10/2001 | Roberts |
| 6,328,526 B1 | 12/2001 | Seki |
| 6,332,336 B1 | 12/2001 | Mirsky |
| 7,972,105 B2 | 7/2011 | Dejoris |
| 2005/0076656 A1 | 4/2005 | Bodell |
| 2005/0154479 A1 | 7/2005 | Narayanan |
| 2007/0234738 A1 | 10/2007 | Borcea |
| 2009/0232663 A1* | 9/2009 | Mirsky ............... F01D 21/02 417/42 |

FOREIGN PATENT DOCUMENTS

| | | |
|---|---|---|
| EP | 1041290 | 10/2000 |
| GB | 2376515 | 12/2002 |

OTHER PUBLICATIONS

Manual—entitled "Series 5 Antisurge Control Application for Centrifugal and Axial Compressors" Publication UM5411 (2.8.0) by Compressor Controls Corporation Dec. 2007.

* cited by examiner

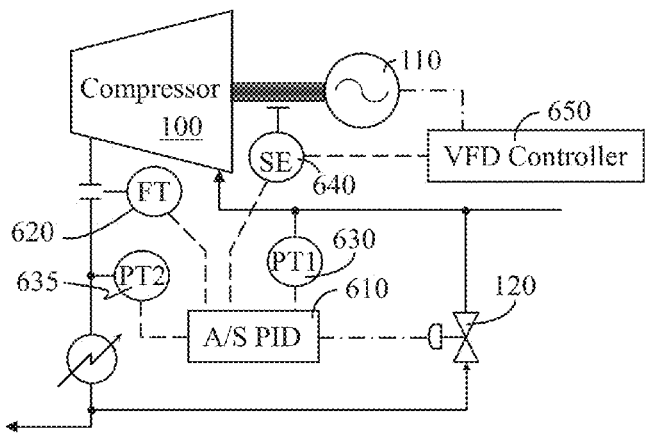
Fig. 6a
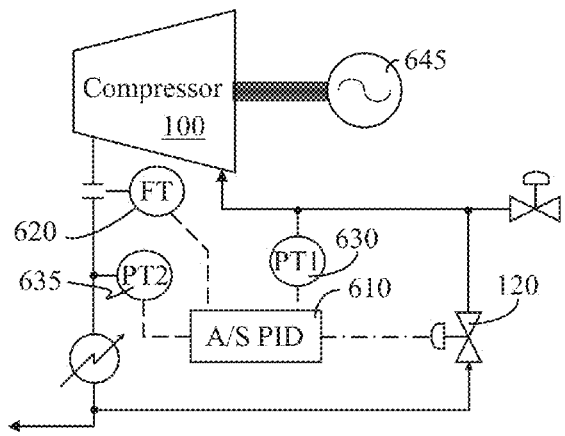
Fig. 6b
Fig. 7

ENHANCED TURBOCOMPRESSOR STARTUP

CROSS REFERENCE TO RELATED APPLICATIONS

This application is a Continuation of U.S. patent application Ser. No. 12/128,265, filed May 28, 2008, this application is also a Continuation-In-Part of U.S. patent application Ser. No. 13/743,418 filed Jan. 17, 2013, now U.S. Pat. No. 8,540,498 issued Sep. 24, 2013, which is a Divisional of U.S. patent application Ser. No. 12/047,938, filed Mar. 13, 2008, now U.S. Pat. No. 8,360,744, issued Jan. 29, 2013, Priority is claimed from all of the above identified applications and all are incorporated herein by reference in their entirety.

BACKGROUND OF THE INVENTION

Field of the Invention

The present invention relates generally to a control scheme. More particularly the present invention relates to a method and apparatus for reducing a shaft power required when starting up a turbocompressor by manipulating the compressor's antisurge recycle valve.

Background Art

As shown in FIG. 1, a turbocompressor 100, whether axial or centrifugal, is driven by a driver such as a variable speed electric motor 110. A recycle valve 120, used for antisurge protection, is piped in parallel with the compressor 100. An inlet throttling valve 130 may be used for compressor capacity or performance control.

As all those of ordinary skill in this art know, surge is an unstable operating condition of a turbocompressor encountered at generally low flow rates. The surge region is shown in FIG. 2 to the left of the surge limit curve 210. In FIG. 2, $H_p$ is the polytropic head and Q is the volumetric flow rate, both associated with the turbo compressor.

For the purposes of this document, including the claims, the compressor's minimum operating speed is hereby defined as the minimum rotational speed, greater than idle speed, at which the compressor may be operated continuously. The minimum operating speed is defined by the compressor manufacturer. It is generally depicted as the lowest performance curve in a compressor performance map such as shown in FIGS. 2 and 3. Lower speeds, greater than idle speed, are experienced on startup and shutdown, but the compressor is not operated continuously at these speeds. For turbocompressors operated at a constant speed, such as those driven by constant speed electric motors, the minimum operating speed is simply the constant operating rotational speed.

As those of ordinary skill know, the accepted startup procedure for a turbocompressor is to increase the rotational speed of the compressor with the antisurge valve 120 wide open until the compressor reaches the compressor's minimum operating speed (if the compressor is operated at variable speed) or the compressor's operating speed (if the compressor is driven by a constant speed driver). At this point in the startup procedure, the antisurge valve 120 is ramped closed and the compressor's 100 automatic performance control takes control of the compressor's rotational speed, inlet throttling valve 130, or variable guide vanes to control the compressor's 100 capacity.

As is recognized by all those of ordinary skill, this startup procedure provides the most safety for the compressor because surge will be avoided, as depicted in FIG. 3. The compressor's 100 operating point trajectory 320 is shown as a dot-dashed line. Curves of constant compressor rotational speed 310a-310e are shown as solid lines. The curve 310a represents the minimum operating rotational speed, while the curve 310e represents the maximum operating rotational speed. Because the recycle valve 120 is maintained in its fully open position until minimum rotational speed has been achieved, the compressor operating point trajectory 320 tends to give wide berth to the surge limit curve 210 in the region below the minimum rotational speed curve 310a.

Additional impetuses for startup with the antisurge valve 120 fully open are that the surge limit curve 210 is usually unknown for rotational speeds less than the minimum operating speed, and that pressure and flow sensor signals of reasonable magnitude must be achieved before a valid compressor operating point may be determined. The compressor's operating point must be calculated to compare its location to the surge limit line 210, or surge control line 220 to avoid having the compressor's operating point cross the surge limit line 210. Antisurge control algorithms are described in the Compressor Controls Series 5 Antisurge Control Application Manual, Publication UM5411 rev. 2.8.0 December 2007, herein incorporated in its entirety by reference.

Due to the large flow through the compressor 100 during startup using the above standard procedure, the shaft power required to drive the compressor 100 is large. This results in slower startup and, possibly, tripping of the driver due to power overload.

A gas turbine driver may experience high exhaust gas temperatures during the startup of a turbocompressor. An electric motor driver may trip on thermal overload due to a current being too high for too long a duration.

There is, therefore, a need for an improved control strategy for the startup of turbocompressors to reduce the loading of the compressor while maintaining the compressor flow out of the unstable, surge region.

BRIEF SUMMARY OF THE INVENTION

An object of the present invention is to provide a method and apparatus for safely starting a turbocompressor while minimizing an overall energy required to accomplish the startup.

Compressors having gas turbine drivers and variable frequency drive electric motors tend to have long startup times—on the order of several minutes. For this class of compressors, a first embodiment of this invention prescribes that the compressor's antisurge valve be maintained at its fully open position until predetermined signal strengths are realized from the compressor's suction and discharge pressure sensors, and the flow sensor. At this point, the antisurge valve is ramped closed at a predetermined rate under control of the antisurge control system to keep the compressor's operating point from crossing the surge control curve. Startup continues independently of the antisurge controller's operation.

A second class of compressors comprises constant-speed electric motor driven compressors. The startup times for this class of compressors tend to be on the order of less than a minute. In this case, the control system starts the antisurge valve in a fully open position, and begins to ramp the antisurge valve closed at a predetermined rate after a predetermined time has elapsed after the initiation of the startup of the compressor. Because of the rapid startup, the pressure and flow sensor signals become viable very quickly, so antisurge control may be carried out before the compressor's operating point reaches the surge control curve.

The novel features which are believed to be characteristic of this invention, both as to its organization and method of operation together with further objectives and advantages thereto, will be better understood from the following description considered in connection with the accompanying drawings in which a presently preferred embodiment of the invention is illustrated by way of example. It is to be expressly understood however, that the drawings are for the purpose of illustration and description only and not intended as a definition of the limits of the invention.

BRIEF DESCRIPTION OF THE SEVERAL VIEWS OF THE DRAWINGS

FIG. 6a is a schematic of a variable speed motor driven compressor system;

FIG. 6b is a schematic of a constant speed motor driven compressor system;

FIG. 7 is a schematic of a turbine driven compressor system;

DETAILED DESCRIPTION OF THE INVENTION

Figure 1:
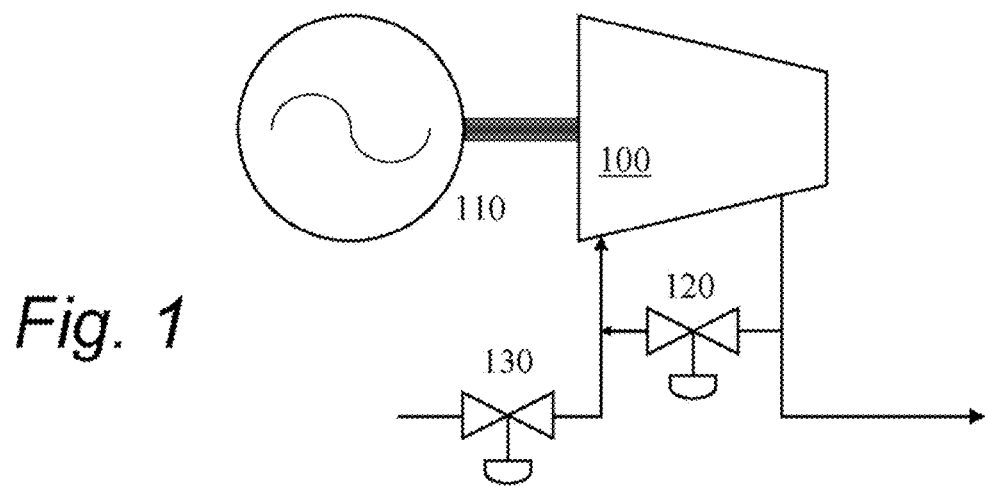
FIG. 1 is a schematic of a compressor, driver, and antisurge recycle valve.
Figure 2:
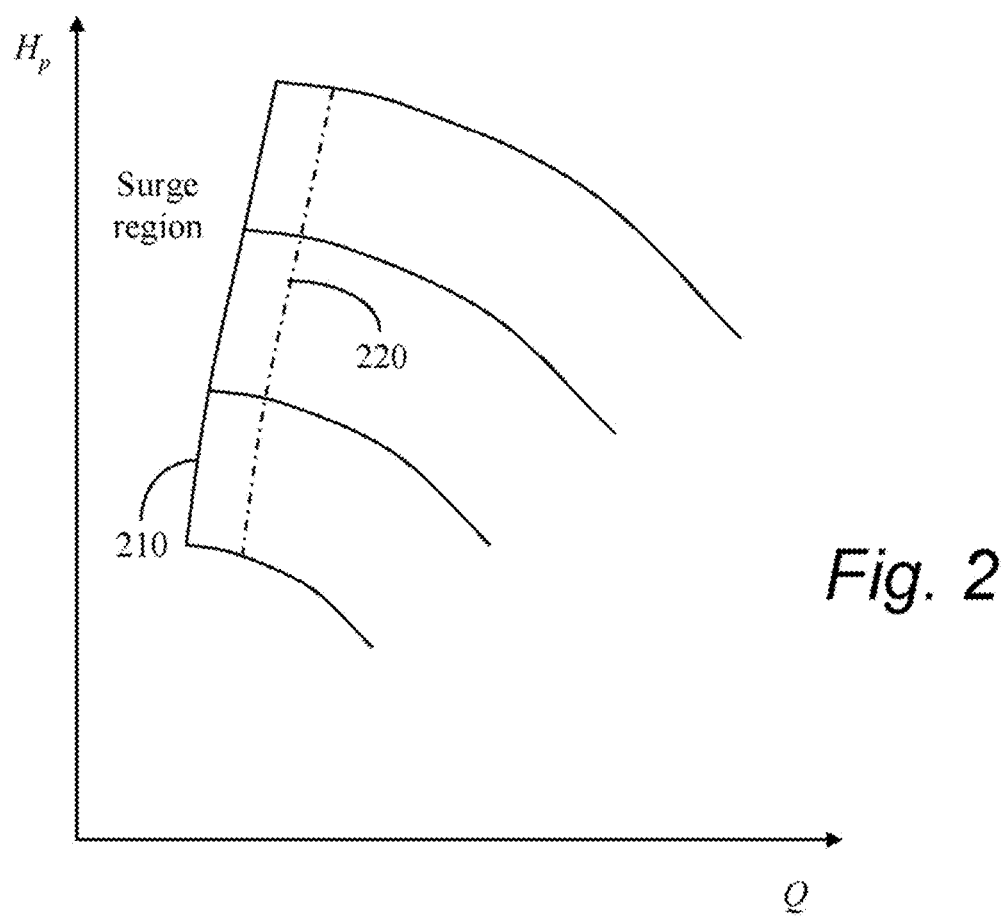
FIG. 2 is a first representative compressor performance map.
Figure 3:
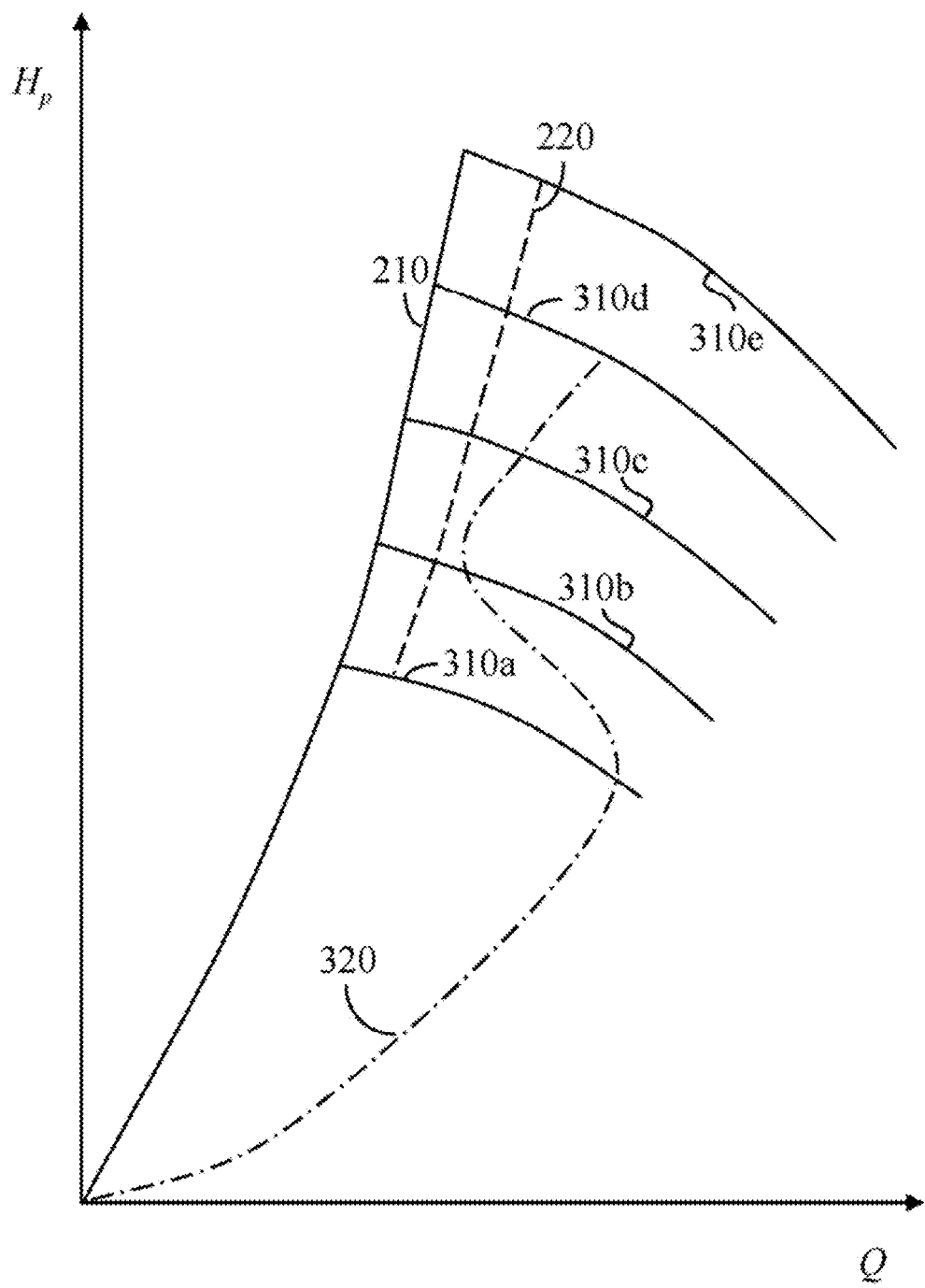
FIG. 3 is a second representative compressor performance map showing a first compressor operating point's startup trajectory.
Figure 4:
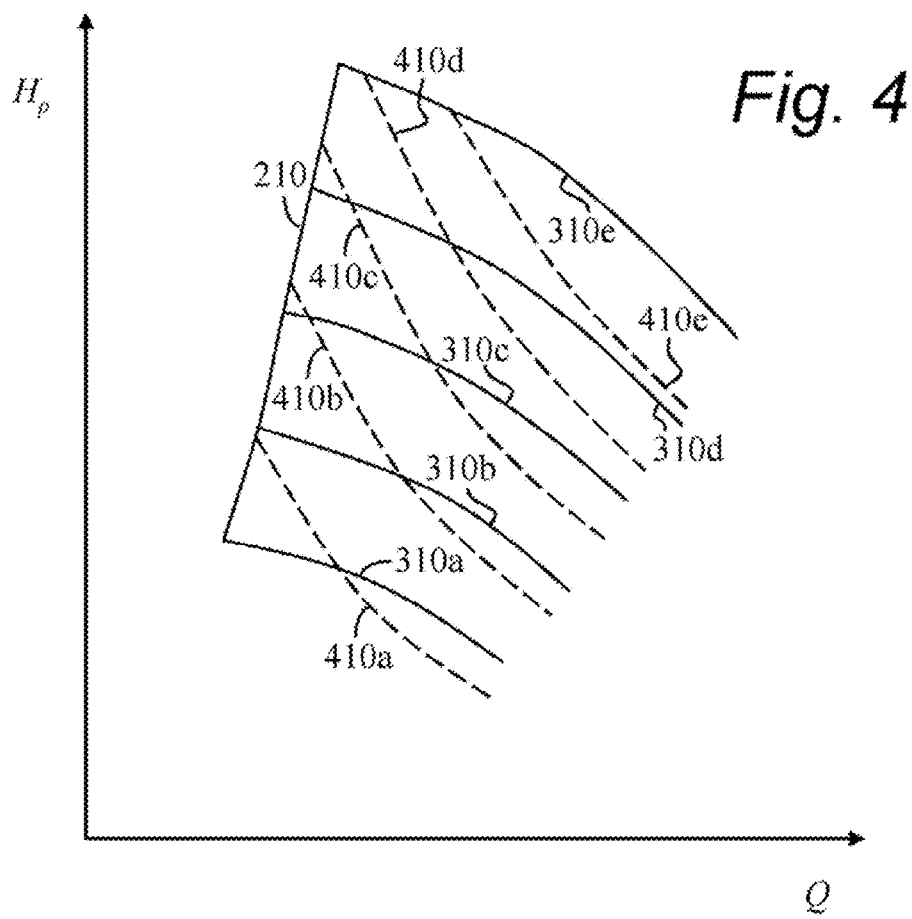
FIG. 4 is a is a third representative compressor performance map showing lines of constant shaft power.

A typical compressor performance map in $H_p$-Q coordinates is shown in FIG. 4. Here, $H_p$ is polytropic head and Q is volumetric flow rate—usually in the suction. The map of FIG. 4 comprises solid-line curves of constant rotational speed 310a-310e and dashed-line curves of constant shaft power 410a-410e. As is clear from the relationship between the curves of constant rotational speed 310a-310e and the curves of constant shaft power 410a-410e, at a given rotational speed, the required shaft power decreases as the operating point moves toward the surge limit 210. To avoid overpowering the compressor driver 110, 710 (see FIG. 7) an operating point trajectory 520, shown in FIG. 5, running as near the surge limit 210 as possible, should be used. The short-dashed curve 510 represents a surge control line—a line set a predetermined distance from the surge limit line 210 toward the stable operating region, thus providing a safety margin for the antisurge control system.

As those of ordinary skill in the art of compressor control know, limit control is applied to the compressor 100 to maintain the operating point at or to the right of the surge control line 510. To effect this control, an antisurge or recycle valve 120, as shown in FIGS. 1, 6a, 6b, and 7, is manipulated to maintain an adequate flow rate through the compressor 100. The manipulation of the antisurge valve 120 is carried out via an automatic control algorithm, such as a closed loop control algorithm, in the antisurge controller, A/S PID 610, of FIGS. 6a, 6b, and 7. Typical inputs to the antisurge controller 610 are shown in FIGS. 6a, 6b, and 7 and comprise a differential pressure signal from a flow transmitter, FT 620, a suction pressure signal from a suction pressure transmitter, PT1 630, a discharge pressure signal from a discharge pressure transmitter, PT2 635, and a rotational speed signal from speed pickup, SE 640 when the driver is variable speed as in FIGS. 6a, and 7. Often, in applications using a constant speed driver, such as a constant speed electric motor 645, as shown in FIG. 6b, no speed pickup SE 640 in included.

Figure 5:
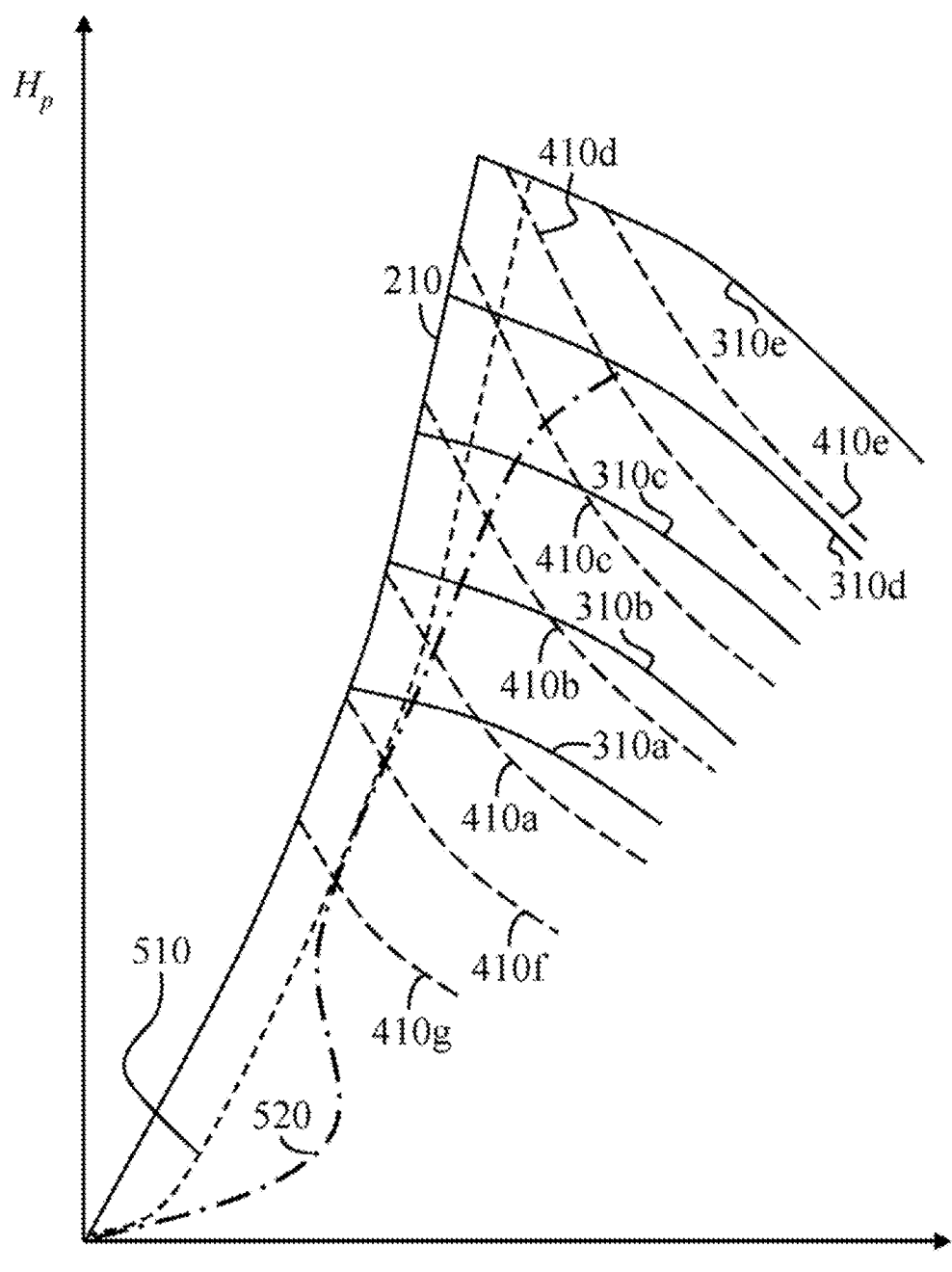
FIG. 5 is a fourth representative compressor performance map showing a second compressor operating point's startup trajectory.

To emulate the operating point trajectory 520 depicted in FIG. 5, the antisurge valve 120 is initially fully open, but is ramped closed by the control system as soon as safe operation may be assured. One embodiment of the instant invention is depicted in the flow diagram of FIG. 8. This embodiment is particularly useful when the startup process is "slow," taking on the order of several minutes from its initiation. As mentioned, the antisurge valve 120 is set initially at its full open position as shown in block 800. The full open position may vary between valve types. Generally, full open in the context of this invention is the greatest opening the antisurge valve 120 will realize in its duty in the specific application. The present invention does not depend on the percent opening value at which the antisurge valve 120 is considered in its full open position.

Figure 11:
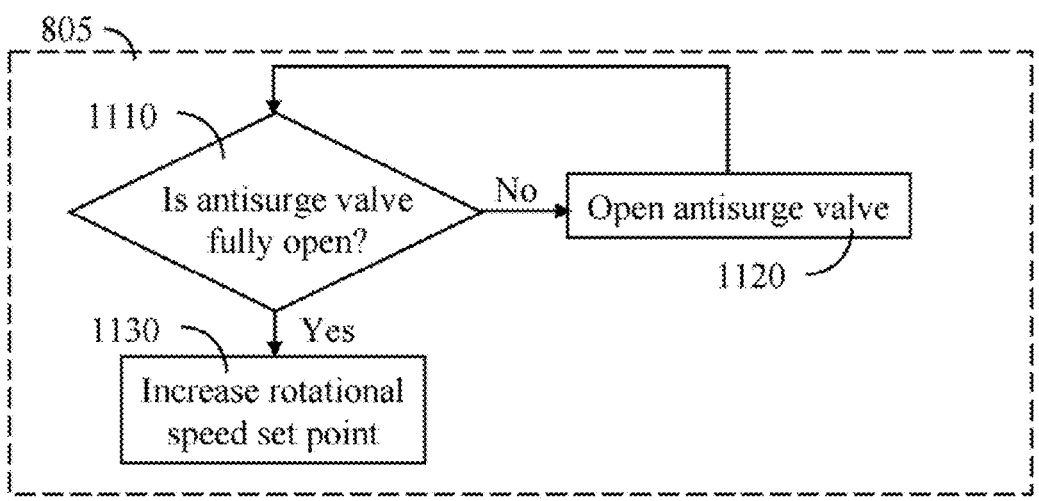
FIG. 11 is a detail flow diagram of a startup initiation process

When the antisurge valve 120 is assured fully open, startup can be initiated as shown in block 805. At startup, the rotational speed of the compressor 100 is increased according to the guidelines and restrictions of the compressor 100 and driver 110, 710 manufacturers and the needs of the equipment owner. In particular, critical speeds, if any, are considered and the startup schedule takes these speeds into consideration. Speed increase is depicted in block 810, and is effected, as shown in FIG. 11, by increasing a compressor speed set point used by a Variable Frequency Drive (VFD) controller 650 (FIG. 6a) or a rotational speed controller 720 (FIG. 7).

As the compressor speed increases, the control system 610 repeatedly checks the signals received from the flow transmitter 620, suction pressure transmitter 630, and discharge pressure transmitter 635. The signal values are compared to threshold values, $\Delta p_{o,min}$, $p_{s,min}$, and $p_{d,min}$, respectively in comparator blocks 815, 820, 825. If the signal magnitude of one or more of the input signals, $\Delta p_o$, $p_s$, and $p_d$, is not at least as great as its respective threshold value, the rotational speed of the compressor 100 continues to be ramped up as indicated in block 810.

Once all three signals, $\Delta p_{o,min}$, $p_{s,min}$, and $p_{d,min}$, exceed their threshold values $\Delta p_{o,min}$, $p_{s,min}$, and $p_{d,min}$, two operations are carried out essentially simultaneously and repeatedly. Each of these operations emanates from and returns to the branch block 830. In one of these operations, the antisurge controller 610 compares the compressor's operating point to the surge control line 510 to determine how the antisurge valve 120 must be manipulated for antisurge protection. If the compressor's operating point is to the right of the surge control line 510 as determined in the comparator block 835, the antisurge valve 120 is ramped toward its closed position according to a predetermined schedule as shown in block 850. If the operating point is on or to the left of the surge control line 510, the antisurge controller 610 manipulates the antisurge valve's 120 position to keep the compressor 100 safe from surge as shown in block 845.

The other essentially simultaneous operation involves continuing to increase the compressor's rotational speed according to block 855 until the minimum operating speed, $N_{min}$, or some predetermined value of speed is reached. Continuing to increase the compressor's rotational speed is effected as explained with regard to block 810: the rotational speed set point used by the VFD controller 650 or the speed controller 720 is increased with time. Those of ordinary skill in this art are intimate with this aspect of startup control. When the comparator block 840 determines the compressor 100 has reached its minimum operating speed, the control system is shifted from its startup mode to its RUN mode, as shown in block 860. At that point, the capacity or performance control system takes over varying the compressor speed according to the needs of the process. Note that the minimum operating speed, $N_{min}$, in comparator block 840 may be the compressor's operating speed if the compressor 120 is to be operated at a constant speed.

Figure 9:
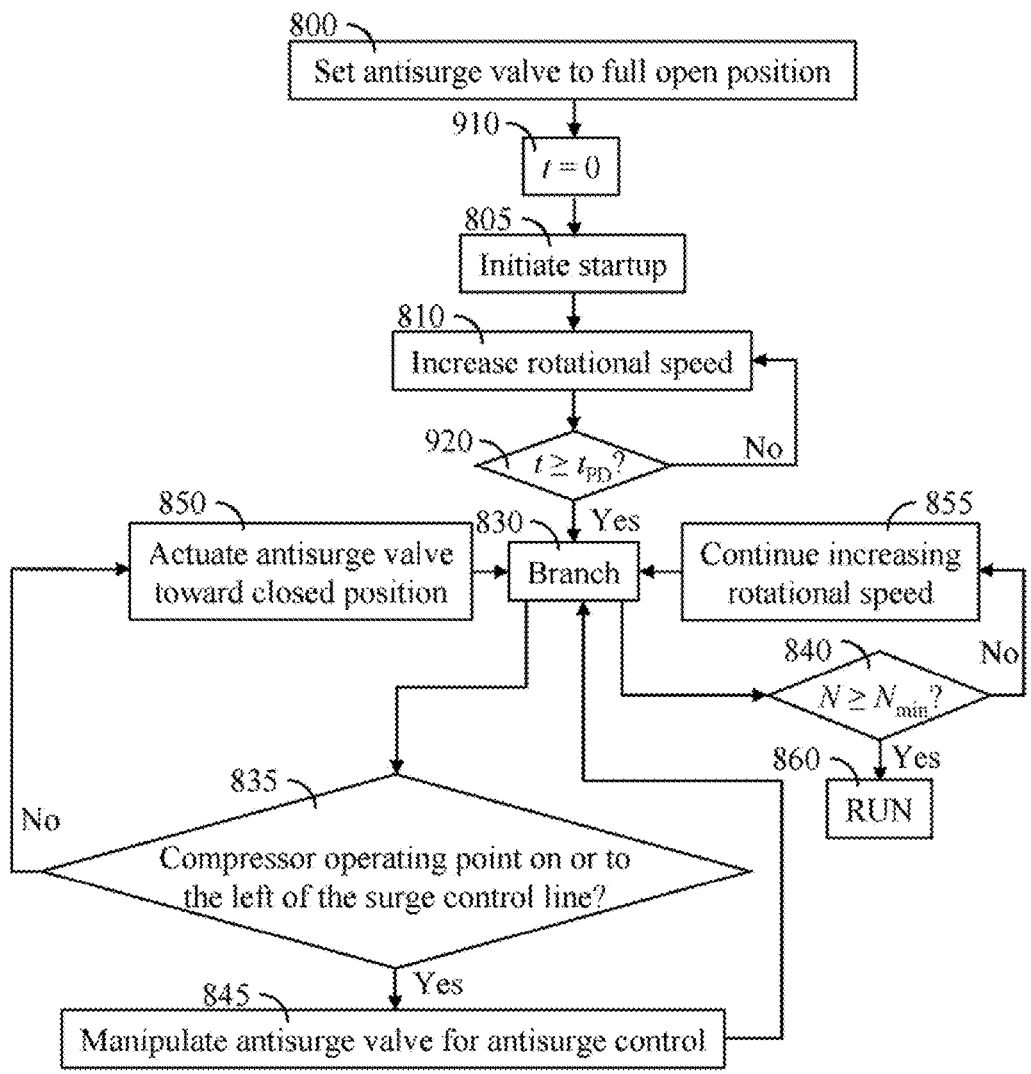
FIG. 9 is a flow diagram of a second embodiment of the present invention.

An additional embodiment is shown in FIG. 9. This embodiment is particularly useful for compressors 120 that may be started rapidly—in less than a minute, for instance. The antisurge valve 120 is set initially at its full open position as shown in block 800. In block 910, a timer is reset to zero.

When the antisurge valve 120 is assured fully open and the timer has been initialized, startup can be initiated as shown in block 805. At startup, the rotational speed of the compressor 100 is ramped up according to the guidelines and restrictions of the compressor 100 and driver 110, 710 manufacturers and the needs of the equipment owner. Speed rampup is carried out by increasing the VFD controller's 650 or rotational speed controller's 720 set point, and is depicted in block 810.

In this embodiment of the invention, the antisurge valve is ramped toward a closed position after a predetermined time elapses. In comparator block 920, the time as reported by the timer is compared to the time threshold, $t_{PD}$. If the time does not exceed the threshold time, the speed continues to increase, but no change to the position of the antisurge valve 120 is made. When the threshold time, $t_{PD}$, has elapsed, two operations are carried out essentially simultaneously and repeatedly. Each of these operations emanates from and returns to the branch block 830. In one of these operations, the antisurge controller 610 compares the compressor's operating point to the surge control line 510 to determine how the antisurge valve 120 must be manipulated for antisurge protection. If the compressor's operating point is to the right of the surge control line 510 as determined in the comparator block 835, the antisurge valve 120 is ramped toward its closed position according to a predetermined ramp rate as shown in block 850. If the operating point is on or to the left of the surge control line 510, the antisurge controller 610 manipulates the antisurge valve's 120 position to keep the compressor 100 safe from surge as shown in block 845.

The other essentially simultaneous operation involves continuing to increase the compressor's rotational speed according to block 855 until the minimum operating speed, $N_{min}$, or some predetermined value of speed is reached. When the comparator block 840 determines the compressor 120 has reached its minimum operating speed, the control system is shifted from its startup mode to its RUN mode, as shown in block 860. At that point, the capacity or performance control system takes over varying the compressor speed according to the needs of the process. Note that the minimum operating speed, $N_{min}$, in comparator block 840 may be the compressor's operating speed if the compressor 120 is to be operated at a constant speed.

Figure 10:
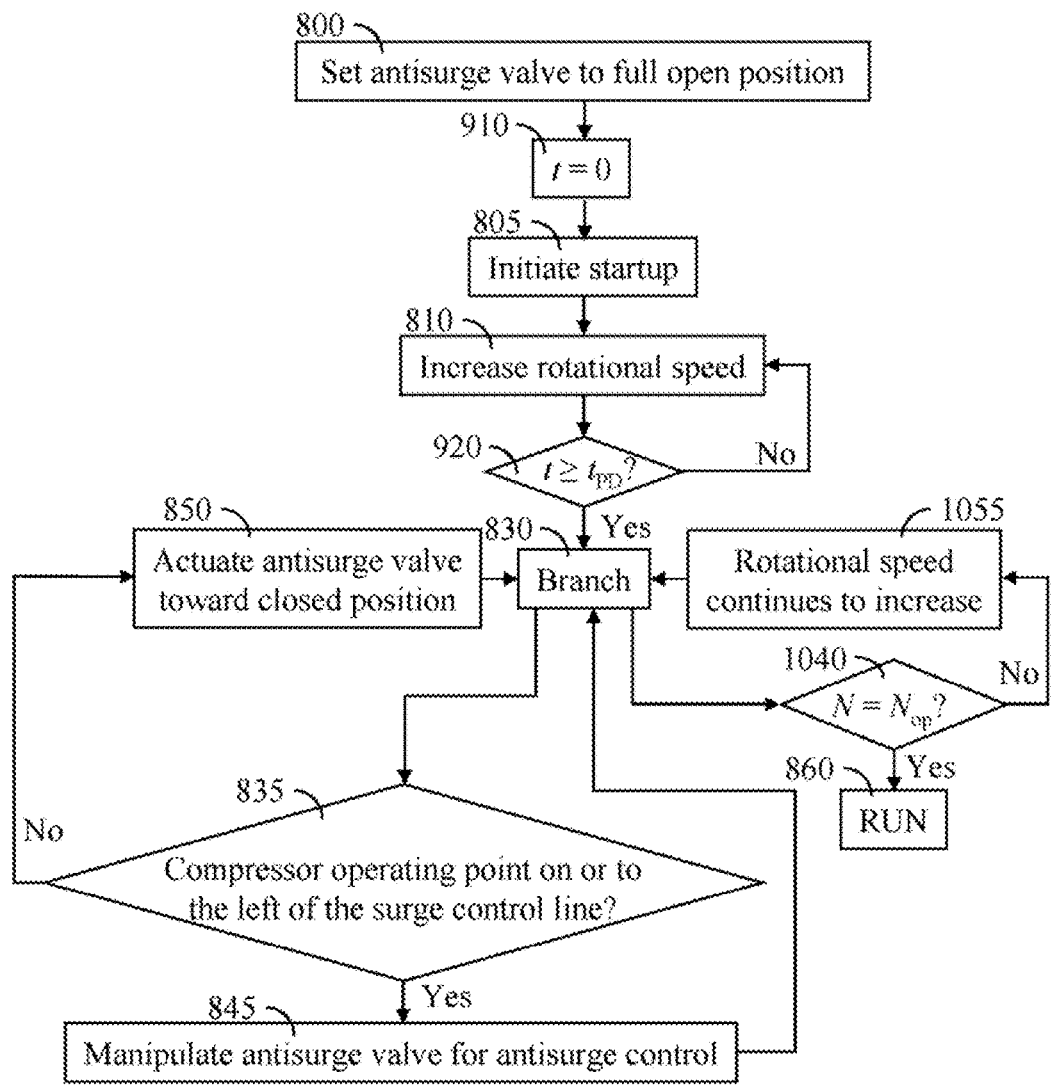
FIG. 10 is a flow diagram of a third embodiment of the present invention.

In FIG. 10, a third embodiment is illustrated, differing from the embodiment of FIG. 9 in that the driver of FIG. 10 is a constant speed driver, such as a constant speed electric motor 640 (FIG. 6b). In this embodiment, the process of accelerating the driver up to its operating speed, $N_{op}$, does not incorporate a decision to continue accelerating the driver inasmuch as the driver will continue to accelerate until its operating speed, $N_{op}$, is reached or it is tripped. Therefore, block 1055 indicates only that the rotational speed continues to rise. Block 1040 is intended only to indicate the compressor rotational speed will increase until the operating speed, $N_{op}$, is reached, and not that a decision is being made in this comparator block. Ultimately, when the compressor has reached its operating speed, $N_{op}$, the control system reverts to a RUN mode 860 wherein performance or capacity control is carried out to satisfy process constraints. Note that, in this case especially, the predetermined time lapse, $t_{PD}$, in comparator block 920 may be zero so the antisurge valve 120 begins to close immediately as startup begins.

The last two embodiments differ from the prior art in that, in the instant invention, time is used to determine when the antisurge valve 120 is ramped toward its closed position, rather than rotational speed.

Figure 8:
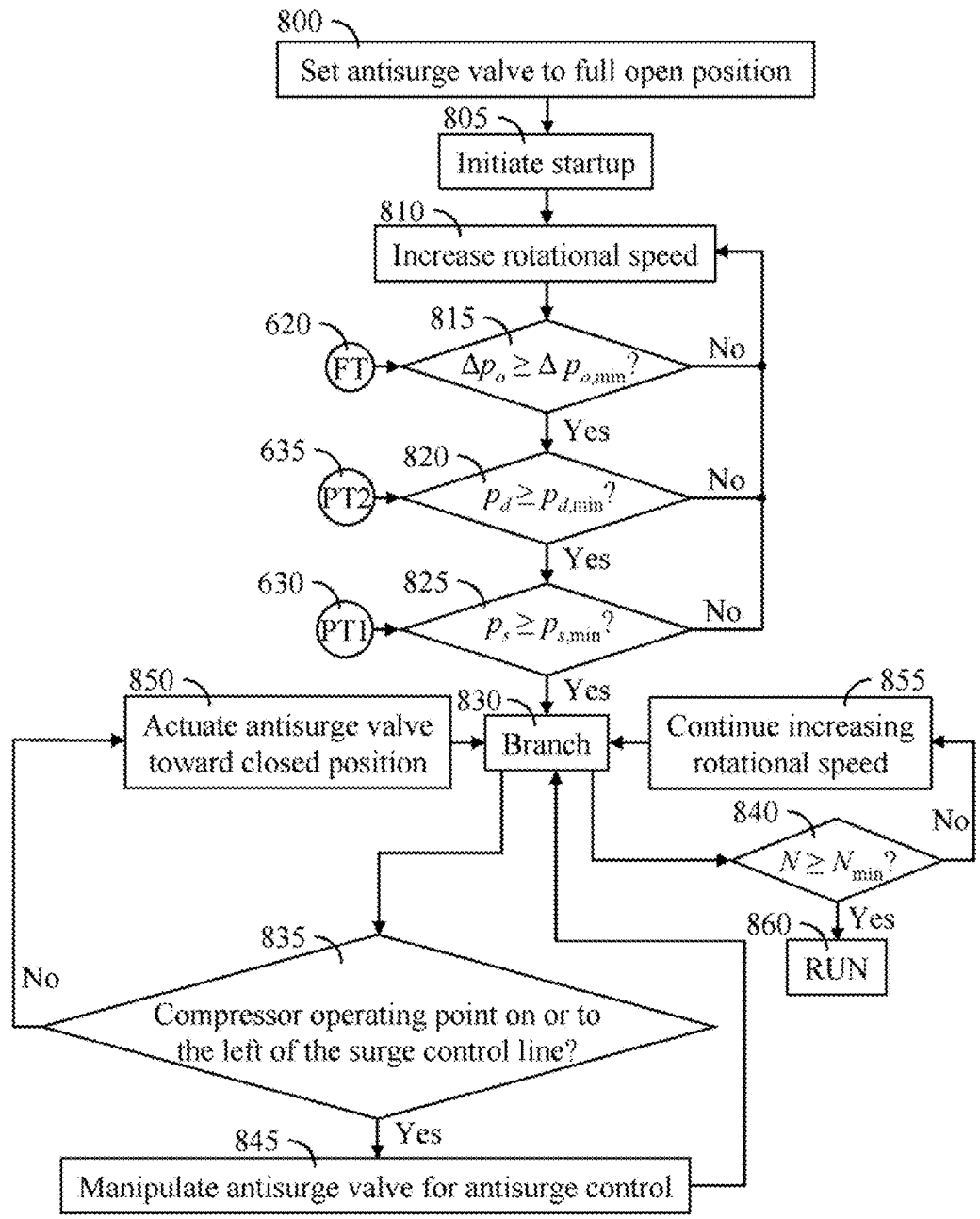
FIG. 8 is a flow diagram of a first embodiment of the present invention.

The flow diagrams in FIGS. 8, 9 and 10 may be considered contents of a logic unit within a compressor control system, such as the antisurge controller 610 depicted in FIGS. 6a, 6b, and 7.

More detail of the startup initiation block 810 is shown in FIG. 11. A check to ascertain the antisurge valve 120 is fully open is first carried out in query block 1110. If the antisurge valve 120 is not fully open, the flow moves to a valve open function 1120. Once the antisurge valve 120 is fully open, the turbocompressor rotational speed is increased from an initial, zero value as shown in block 1130.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

The invention claimed is:

1. A method of minimizing an energy required to start a turbocompressor having an antisurge valve and a control system, the method comprising:
   opening the antisurge valve to a full open position;
   initiating a startup of the turbocompressor;
   increasing a rotational speed of the turbocompressor from a zero rotational speed;
   receiving, by the control system, a plurality of input signals, wherein each input signal includes a value;
   comparing the value included in each of the plurality of input signals with a respective minimum threshold value; and
   actuating the antisurge valve toward a closed position, in response to determining that the value associated with each of the plurality of input signals is greater than the respective minimum threshold value and before said turbocompressor reaches a minimum operating rotational speed.

2. The method of claim 1, wherein the plurality of input signals comprises a differential pressure signal and wherein an initiation of a closing of the antisurge valve comprises:

initiating the closing of the antisurge valve when the value of the differential pressure signal exceeds the minimum threshold value.

3. The method of claim 1, wherein the minimum operating rotational speed comprises a constant operating rotational speed of the turbocompressor, the method additionally comprising:
permitting a driver of the turbocompressor to reach the constant operating rotational speed; and
operating the turbocompressor at the constant operating rotational speed.

4. The method of claim 1, wherein increasing a rotational speed of the turbocompressor from a zero rotational speed comprises:
increasing a turbocompressor rotational speed set point within the control system; and
controlling the turbocompressor rotational speed based on said turbocompressor rotational speed set point.

5. The method of claim 1, wherein actuating the antisurge valve towards its closed position before said turbocompressor reaches a minimum operating rotational speed comprises:
detecting a signal indicating a turbocompressor operating point;
comparing said signal to a value representing a surge control line; and
manipulating the antisurge valve to keep the turbocompressor operating point from residing nearer a surge region than the surge control line.

6. The method of claim 1, wherein the plurality of input signals comprises a differential pressure signal, a suction pressure signal and a discharge pressure signal.

7. An apparatus comprising:
an antisurge valve;
a control system comprising:
a first control system function to generate a first signal to open the antisurge valve to a full open position;
a second control system function to initiate a startup of a turbocompressor and increase a rotational speed set point of the turbocompressor from a zero rotational speed set point;
a third control system function to determine whether conditions are appropriate to initiate a closing of the antisurge valve before said turbocompressor reaches a minimum operating rotational speed; and
a fourth control system function to generate a second signal to actuate the antisurge valve towards its closed position in response to the third control system function determining that conditions are appropriate to initiate the closing of the antisurge valve.

8. The apparatus of claim 7, additionally comprising:
a measurement system configured to generate at least one signal including a value and forward the at least one signal to the control system;
a comparator in the control system to compare the value included in the at least one signal with a minimum threshold value; and
an antisurge actuation signal generating function within the control system to initiate a closing of the antisurge valve when the value exceeds the minimum threshold value.

9. The apparatus of claim 7, wherein the second control system function additionally comprises:
a rotational speed set point generating function within the control system; and
a feedback control system to control the turbocompressor rotational speed based on said rotational speed set point.

10. The apparatus of claim 7, wherein the control system is configured to:
receive a plurality of signals generated by a measurement system, wherein each of the plurality of signals includes a value,
compare the value in each of the plurality of signals with a respective minimum threshold value, and
initiate a closing of the antisurge valve when the value included in each of the plurality of signals exceeds the respective minimum threshold value.

11. The apparatus of claim 7, wherein the fourth control system function is configured to:
receive a first signal indicating a turbocompressor operating point;
compare said first signal to a value representing a surge control line; and
manipulate the antisurge valve to keep the turbocompressor operating point from residing nearer a surge region than the surge control line.

12. The apparatus of claim 7, wherein when determining whether conditions are appropriate to initiate the closing of the antisurge valve, the third control system function is configured to:
compare a value associated with at least two of a differential pressure signal, a suction pressure signal or a discharge pressure signal to respective minimum threshold values, and
determine that the conditions are appropriate to initiate the closing of the antisurge valve when the value associated with each of the at least two signals is greater than the respective minimum threshold value.

13. The apparatus of claim 7, wherein when determining whether conditions are appropriate to initiate the closing of the antisurge valve, the third control system function is configured to:
compare a value associated with each of a differential pressure signal, a suction pressure signal and a discharge pressure signal to a respective minimum threshold value, and
determine that the conditions are appropriate to initiate the closing of the antisurge valve when the value associated with each of the differential pressure signal, the suction pressure signal and the discharge pressure signal is greater than the respective minimum threshold value.

14. The apparatus of claim 7, further comprising:
the turbocompressor.

15. An apparatus, comprising:
an antisurge valve;
a constant speed turbocompressor driver having a constant operating rotational speed; and
a control system configured to:
generate a first signal to open the antisurge valve to a full open position,
initiate a startup of a turbocompressor to increase a rotational speed of the turbocompressor from a zero rotational speed,
determine whether to initiate a closing of the antisurge valve before said turbocompressor reaches the constant operating rotational speed, and
generate a second signal to actuate the antisurge valve towards its closed position in response to determining to initiate the closing of the antisurge valve.

16. The apparatus of claim 15, wherein when determining whether to initiate the closing of the antisurge valve before said turbocompressor reaches the constant operating rotational speed, the control system is configured to:

compare a value associated with at least two of a differential pressure signal, a suction pressure signal or a discharge pressure signal to a respective minimum threshold value, and determine to initiate the closing of the antisurge valve when the value associated with each of the at least two signals is greater than the respective minimum threshold value.

17. The apparatus of claim 15, wherein when determining whether to initiate the closing of the antisurge valve before said turbocompressor reaches the constant operating rotational speed, the control system is configured to:

compare a value associated with each of a differential pressure signal, a suction pressure signal and a discharge pressure signal to a respective minimum threshold value, and determine to initiate the closing of the antisurge valve when the value associated with each of the differential pressure signal, the suction pressure signal and the discharge pressure signal is greater than the respective minimum threshold value.

18. The apparatus of claim 17, further comprising:

a flow transmitter configured to transmit the differential pressure signal to the control system;

a suction pressure transmitter configured to transmit the suction pressure signal to the control system; and a discharge pressure transmitter configured to transmit the discharge pressure signal to the control system.

19. The apparatus of claim 15, further comprising:

the turbocompressor.

* * * * *